UNITED STATES PATENT OFFICE.

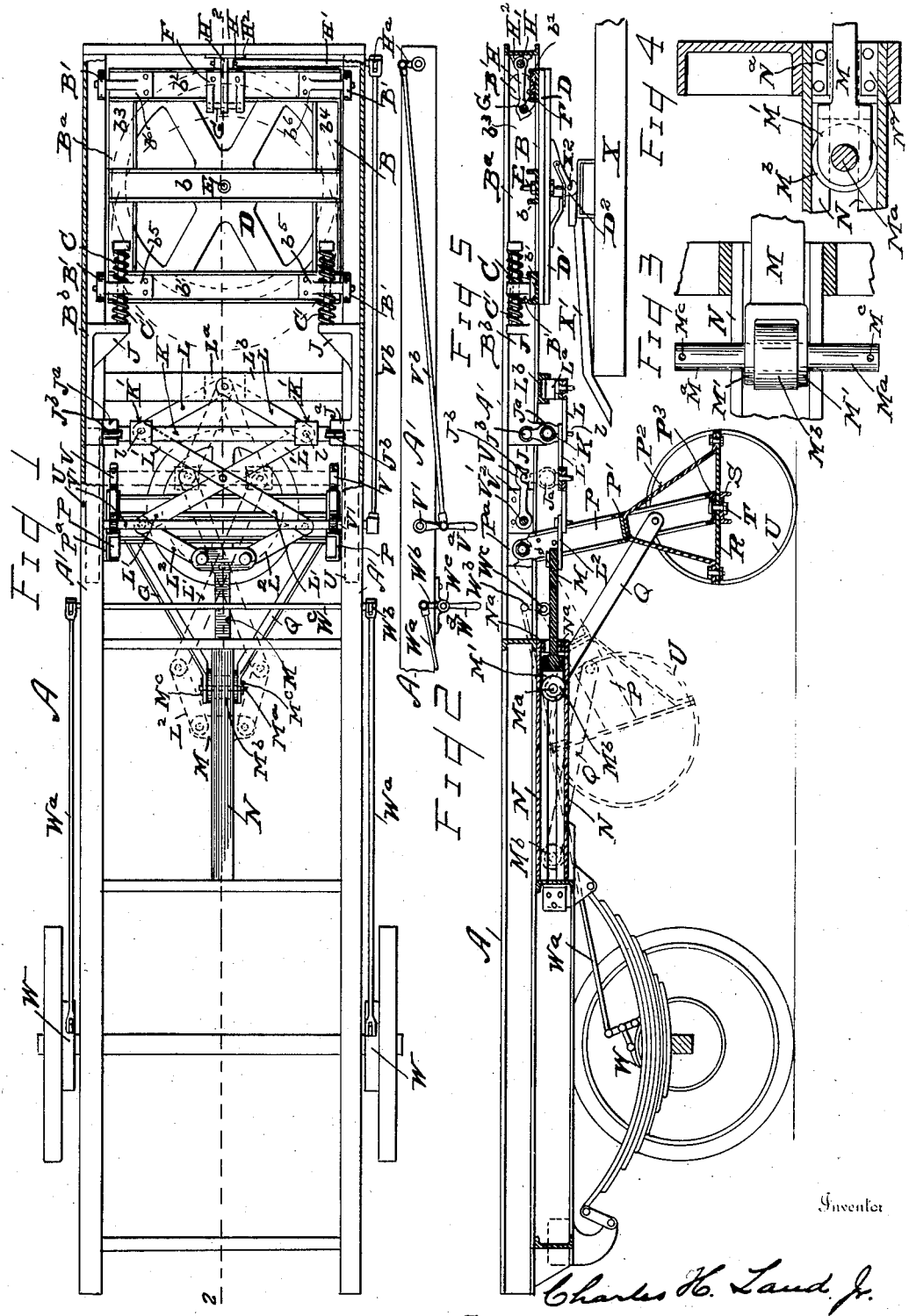

CHARLES H. LAND, JR., OF DETROIT, MICHIGAN, ASSIGNOR OF ONE-HALF TO WILLIAM H. WILSON, OF DETROIT, MICHIGAN.

TRAILER.

1,408,102.

Specification of Letters Patent.  Patented Feb. 28, 1922.

Application filed June 13, 1921. Serial No. 477,030.

*To all whom it may concern:*

Be it known that I, CHARLES H. LAND, Jr., a citizen of the United States, residing at Detroit, county of Wayne, State of Michigan, have invented a certain new and useful Improvement in Trailers, and declare the following to be a full, clear, and exact description of the same, such as will enable others skilled in the art to which it pertains to make and use the same, reference being had to the accompanying drawings, which form a part of this specification.

My invention relates to means for effecting the automatic coupling of a trailer to a tractor.

One of the features of the present invention is a divided auxiliary movable frame, connected together by spring draw-bars, mounted upon rollers adapted to traverse the flanges of channel members forming the side sills of the main frame of the trailer. To the auxiliary frame is bolted the stationary member of a fifth wheel to which is pivoted the rotatable member of the fifth wheel. Connected with the movable frame is a toggle mechanism or lazy-tongs which when actuated through the movement of the auxiliary frame is adapted to raise a supporting leg pivoted to the frame of the trailer.

Another feature of the invention consists in means for securing the movable frame in both its initial, and ultimate positions;— namely, when the leg of the trailer is lowered to support its forward end, or when the leg is raised upon coupling the trailer with a tractor.

A further object of the invention consists in means for manually effecting the alternate locking and releasing of said movable frame at the limit of its movement in either direction.

A further object of the invention is to provide for automatically locking the movable frame when the supporting leg is raised following the coupling of the trailer to a tractor.

A further object of the invention consists in providing means whereby the supporting leg is adapted to incline forwardly toward the front of the trailer when not coupled to a tractor; the purpose being to relieve the toggle mechanism of stresses due to the weight of the trailer and its load, the construction of the leg being such that the turntable supported thereby will occupy a horizontal position when the leg is inclined that the supporting wheel may be readily adjusted as required.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the accompanying drawings forming part of this specification:

Figure 1 is a plan view of the trailer with parts broken away and in section showing the movable frame and toggle mechanism shifted to the limit of its movement as indicated in dotted lines.

Figure 2 is a longitudinal vertical sectional view taken on or about line 2—2 of Figure 1.

Figure 3 is a fragmentary detail view of the slide bar connected with the toggle mechanism, showing the channel member in which the roller carried by the slide bar is guided.

Figure 4 is another fragmentary detail view in vertical cross section of the slide bar, showing stop-blocks secured to the channel members for limiting the movement of the slide bar.

Figure 5 is a fragmentary elevation of the side sill of the trailer, showing manually operated means for locking and releasing the movable frame supported in the side sills of the trailer, at the limit of its movement in either direction.

Referring now to the letters of reference placed upon the drawings:

A, denotes a trailer, A' the side sills or members of a trailer frame, constructed preferably of channel iron. B, indicates a movable frame, comprising two sections B$^a$ and B$^b$, connected together by a spring draw bar C. The forward part of the movable frame is constructed of channel members $b$, $b'$, $b^2$, $b^3$ and $b^4$ which are riveted or otherwise secured together. $b^5$ $b^5$ and $b^6$ $b^6$, denote castings riveted to the channel members $b'$ and $b^2$ and serve as hangers for the rollers B' B' which traverse the flanges of the side members A' of the trailer frame.

D, denotes a stationary member of a fifth wheel bolted to the channel members $b'$ $b^2$, etc., of the movable frame B. D' indicates the rotatable member of the fifth wheel secured to the stationary member D by a king-bolt E. To the channel member $b^2$ is riveted or otherwise secured a casting F in which is supported a bar G, adapted to be engaged by a hook H pinned to a transverse shaft H', journaled in the casting $H^2$;—in turn bolted to the end member of the trailer frame. $c$ $c'$ are draw-bars slidable through the castings $b^5$ $b^5$ and are screwed or otherwise attached at one end to the castings J, J, slidable in the channels formed by the side members A' of the trailer frame. K, denotes a tubular shaft fitted into bosses $J^a$ formed in the casting J. K' K' are sleeves slidable upon the tubular shaft K to which are pivoted toggle arms L, L, the arms being in turn pivoted to a plate $L^a$, bolted to the rigid transverse cross member $L^b$. L' L' are toggle arms pivoted at $l$ to the sleeves K'. M denotes a slide bar having lateral extensions at its forward end to which are pivoted the toggle links $L^2$ $L^2$, which are in turn pivoted to the toggle arms L' L'. At its opposite end the slide bar M is forked as indicated at M', to receive a transverse pivot pin $M^a$. $M^b$ is a roller mounted upon the pivot pin between the forked portion of the slide bar. N, N, are opposing channel members forming a track or guide for the roller $M^b$. $N^a$ are stop-blocks riveted to the channel members N, N, to limit the movement of the slide-bar in a forward direction. P, P, are swinging legs pivoted to suitable castings $P^a$ secured to the side members A' of the trailer frame. Q, Q, are links pivoted to the swinging legs P at one end and at the other end to the pivot pin $M^a$, carried by the slide bar M. $M^c$ are cotter pins to secure the links against accidental dislodgment. P' is a cross brace of channel iron secured to the swinging legs P, P. $P^2$ is a central brace—riveted to the brace P,—to which is secured a circular plate R, which is also attached to a cross member $P^3$ connecting the lower ends of the swinging leg. S, is a rotable axle member pivoted to the central plate R by a king bolt T. U, U, denote wheels mounted upon the spindles of the rotatable axle S. V, V, are rocking hooks mounted on a transverse rock shaft V' journaled in the side members A' of the trailer adapted to engage lugs $J^b$ extending upwardly from the boss $J^a$, formed on the castings J. $V^a$ is a handle attached to the rock shaft V'. $V^b$ is a connecting rod pivoted to the handle $V^a$ and to a rocker arm $H^a$ upon transverse shaft H'. W indicates a brake connected by brake rods $W^a$ to the rocker arms $W^b$ on the transverse shaft $W^c$. $W^d$ is a handle for manually actuating the brake.

X denotes a tractor provided with the usual inclined slide members X' leading upwardly to a transverse coupling bar $X^2$ adapted to be engaged by a latch member $D^2$ extending downwardly from the rotatable member D' of the fifth wheel;—means forming the subject matter of another application being provided to secure the coupling bar in coupling relation with the latch members until manually released.

Having indicated the several parts by reference letters the construction and operation of the device will be readily understood.

The trailer will first be considered as in position to couple with a tractor,—see Figure 2,—with the leg for supporting the forward end of the trailer resting upon the ground. The tractor is then backed into the trailer in such a way that the coupling latches of the fifth wheel engage the coupling bar of the tractor, the brake of the trailer being first manually set by means of the handle $W^d$. The hook H may then be raised by the handle $V^a$ thus releasing the movable frame B. The frame being supported by the rollers B' in the side sills of the trailer frame is forced backwardly through the action of the tractor. The backward movement of the frame B serves to operate the toggle arms L, L, to which the slide bar M is connected;—the slide bar being supported by the roller $M^b$,—which travels in the track formed by the opposing channels N, N. The backward movement of the slide bar serves to lift the supporting leg of the trailer which is connected by the links Q with the pivot pin $M^a$ of the roller $M^b$ thus raising the supporting leg from the ground to the position indicated in dotted lines in Figure 2. As the frame B moves backward the lugs $J^b$ force upwardly the hooks V, V, and are engaged by them;—all further rearward movement of the frame being prevented by the stop lugs $V^2$ riveted to the side sills of the trailer. The movable frame being now locked the trailer is in condition for hauling upon the release of the brake mechanism;—it being apparent that the portion of the frame carrying the fifth wheel is adapted to move backward and forward on its rollers against the action of the coiled springs carried by the draw bars C;—the springs of the draw bars absorbing all shocks of starting and stopping.

It will be noted that the weight of the trailer frame and its load will have a tendency to force the supporting leg forward resulting in a tension of the links Q and causing the shoulder formed by the forked end M' of the slide bar M to bear against the stop-blocks $N^a$;—thus a light linkage may be utilized thereby greatly reducing the cost of construction.

When the supporting leg is in its forwardly inclined position the turn table carried thereby will be in a horizontal position and free to turn in any required direction, thus relieving the toggle mechanism of stresses that might otherwise obtain.

Having thus described my invention what I claim is:

1. In a trailer; a movable frame supported by the frame of the trailer; a rotatable fifth wheel mechanism carried by the movable frame; a supporting leg pivoted to the trailer frame; means connected with said movable frame adapted to raise and lower the supporting leg; means for locking the frame at the limit of its movement in either direction and means for releasing said locking means.

2. In a trailer; a divided movable frame supported in the frame of the trailer; spring draw bars connecting the divided portions of the frame together; a rotatable fifth wheel mechanism carried by one portion of said divided frame; a supporting leg pivoted to the trailer frame; means connected with said supporting leg and actuated through the movement of the divided frame for raising and lowering the supporting leg; means for locking the frame at the limit of its movement in either direction and means for releasing said locking means.

3. In a trailer; a divided movable frame carried by the frame of the trailer; spring draw-bars connecting the divided portions of the movable frame together; an extensible member adapted to be actuated by the movable frame; a slidable bar connected with said extensible member; a swinging leg pivoted to the frame of the trailer; means connecting the swinging leg with the slidable bar; means for locking the movable frame in its initial and ultimate position and means for alternately releasing the respective locking means.

4. In a trailer; a folding supporting leg pivoted to the frame of the trailer; a divided movable frame supported in the walls of the trailer; yieldable means adapted to connect the divided portions of the movable frame together; a toggle mechanism connected at one end to a fixed member of the trailer frame; a slidable bar connected to the free end of the toggle mechanism; means connecting the slidable bar with the folding leg and means for securing said movable frame in its initial and adjusted positions.

5. In a trailer; a divided movable frame mounted upon wheels traveling upon side sills of the trailer frame; spring draw-bars connecting the divided portions of the movable frame together; a toggle mechanism connected at one end to a fixed member of the trailer frame; slidable sleeves mounted upon a cross member carried by one portion of the divided frame; a slidable bar connected to the free end of the toggle mechanism; a swinging leg pivoted to the trailer frame; means connecting the slidable bar with the swinging leg; and means for securing the movable frame in its initial and adjusted positions.

6. In a trailer; a folding supporting leg; a divided movable frame mounted upon wheels traveling upon side sills of the trailer frame; spring draw-bars connecting the divided portions of the movable frame together; a toggle mechanism connected at one end to a fixed member of the trailer frame; a slidable bar connected to the free end of the toggle mechanism; a caster carried by the end of the slidable bar adapted to roll between channel bars forming the frame of the trailer; links connecting the supporting leg with the pivot pin of the caster; and means for securing the movable frame in its initial and adjusted positions.

7. In a trailer; folding supporting legs pivoted to the frame of the trailer adapted to project forwardly at an angle to the body portion when supporting the latter and fitted with a turn table adapted to assume a horizontal plane parallel to the body of the trailer when the legs are in an inclined supporting position; an axle pivoted to said turn table; supporting wheels mounted upon the axle; a slidable frame mounted in the trailer frame; and means connected with the slidable frame adapted through the movement of the slidable frame to raise or lower the supporting legs.

8. In a trailer; a divided movable frame slidable in the frame of the trailer; spring draw-bars connecting the divided portions of the frame together; a rotatable fifth wheel mechanism carried by one portion of said divided frame; means carried by said fifth wheel mechanism adapted to co-operate with suitable mechanism carried by a tractor for coupling the tractor and trailer together; a supporting leg pivoted to the trailer frame; means connected with said supporting leg and actuated through the movement of the divided frame for raising or lowering the supporting leg; and means for locking the frame at the limit of its movement in either direction.

9. In a trailer; folding supporting legs pivoted to the frame of the trailer adapted to project at an angle to the body portion when supporting the latter; a turn table carried by said legs so positioned upon the legs that it may assume a horizontal plane when the legs are in an inclined supporting position; an axle pivoted to said turn table; supporting wheels mounted upon the axle; a slidable frame mounted upon the trailer frame; a toggle mechanism connected with the slidable frame adapted through the movement of the slidable frame to raise or lower the supporting legs; and means to relieve the toggle mechanism of stresses due to the weight of the trailer and its load when the legs are in their forwardly inclined supporting position.

10. In a trailer; a divided slidable frame; spring draw-bars adapted to connect said divided frame together; a rotatable fifth wheel mechanism carried by one portion of said slidable frame; means carried by the fifth wheel adapted to couple the trailer with a tractor; a folding supporting leg pivoted to the frame of the trailer; means connected with the other portion of the slidable frame adapted to raise or lower the supporting leg through the movement of the slidable frame; and means for locking the movable frame at the limit of its movement in either direction.

11. In a trailer; a divided movable frame mounted upon wheels traveling upon the side sills of the trailer frame; spring drawbars connecting the divided portions of the movable frame together; a toggle mechanism connected at one end to a fixed member of the trailer frame; slidable sleeves mounted upon a cross member carried by one portion of the divided frame; a slidable bar connected to the free end of the toggle mechanism; a swinging leg pivoted to the trailer frame; links connecting the slidable bar with the swinging leg; rocking latch members adapted to be automatically actuated by the movable frame at the limit of its movement in either direction to secure the movable frame; and means for manually operating said latch members whereby the movable frame may be released as required.

In testimony whereof, I sign this specification in the presence of two witnesses.

CHARLES H. LAND, Jr.

Witnesses:
S. E. THOMAS,
JOHN CONSIDINE.